(12) United States Patent
Hayasaka (10) Patent No.: US 11,462,052 B2
(45) Date of Patent: Oct. 4, 2022

(54) IMAGE PROCESSING DEVICE, IMAGE PROCESSING METHOD, AND RECORDING MEDIUM

(71) Applicant: NEC Corporation, Tokyo (JP)

(72) Inventor: Akihiro Hayasaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 35 days.

(21) Appl. No.: 16/769,739

(22) PCT Filed: Dec. 20, 2017

(86) PCT No.: PCT/JP2017/045633
§ 371 (c)(1),
(2) Date: Jun. 4, 2020

(87) PCT Pub. No.: WO2019/123554
PCT Pub. Date: Jun. 27, 2019

(65) Prior Publication Data
US 2021/0174062 A1    Jun. 10, 2021

(51) Int. Cl.
G06T 7/00     (2017.01)
G06V 40/16    (2022.01)
G06F 21/32    (2013.01)

(52) U.S. Cl.
CPC ............ *G06V 40/161* (2022.01); *G06F 21/32* (2013.01); *G06T 7/0002* (2013.01); *G06T 2207/20216* (2013.01); *G06T 2207/30201* (2013.01)

(58) Field of Classification Search
CPC ... G06K 9/00228; G06F 21/32; G06T 7/0002; G06T 2207/20216; G06T 2207/30201; G06T 7/00

USPC ................. 382/181, 118, 190, 255
See application file for complete search history.

(56) References Cited

U.S. PATENT DOCUMENTS

| | | | |
|---|---|---|---|
| 9,129,185 B1* | 9/2015 | Murata | G06T 5/003 |
| 9,898,674 B2* | 2/2018 | Connell, II | G06K 9/00912 |
| 9,911,395 B1* | 3/2018 | Townsend | G06F 1/1686 |
| 10,019,810 B2* | 7/2018 | Arnison | G06T 7/571 |
| 2012/0121202 A1* | 5/2012 | Wang | H04N 5/23277 |
| | | | 382/255 |
| 2012/0134596 A1* | 5/2012 | Yamada | G06T 7/246 |
| | | | 382/199 |

(Continued)

FOREIGN PATENT DOCUMENTS

| | | |
|---|---|---|
| JP | 2006-157427 A | 6/2006 |
| JP | 2010-79446 A | 4/2010 |
| JP | 2010-217954 A | 9/2010 |

OTHER PUBLICATIONS

Nayar et al., "Shape from Focus", IEEE Transactions on Pattern Analysis and Machine Intelligence, vol. 16, Issue: 8, Aug. 1994, pp. 824-831 (total 8 pages).

(Continued)

*Primary Examiner* — Sheela C Chawan
(74) *Attorney, Agent, or Firm* — Sughrue Mion, PLLC (57) ABSTRACT

An image processing device according to the present invention includes: a memory; and at least one processor coupled to the memory. The processor performs operations. The operations includes: detecting a feature point to be used for authentication of a target object included in an image; calculating a first blur being a blur of a predetermined processing point in the feature point; and estimating, by using the first blur, a second blur being a blur of the target object.

10 Claims, 8 Drawing Sheets

(56) References Cited

U.S. PATENT DOCUMENTS

2014/0321738 A1* 10/2014 Shibata .................. G06T 5/003
                                                          382/160
2015/0146994 A1*  5/2015 Arnison ................. G06T 7/571
                                                          382/254

OTHER PUBLICATIONS

International Search Report for PCT/JP2017/045633 dated Mar. 20, 2018.
Written Opinion for PCT/JP2017/045633 dated Mar. 20, 2018.

* cited by examiner

Fig. 3

○ FEATURE POINT

Fig. 4

○ FEATURE POINT                  □ PROCESSING POINT

Fig. 7

IMAGE PROCESSING DEVICE, IMAGE PROCESSING METHOD, AND RECORDING MEDIUM

This application is a National Stage Entry of PCT/JP2017/045633 filed on Dec. 20, 2017, the contents of all of which are incorporated herein by reference, in their entirety.

TECHNICAL FIELD

The present invention relates to image processing, and particularly to processing of blur of an image.

BACKGROUND ART

There are many situations in which an image is desired to be sorted out according to a degree of blur of the image (hereinafter, referred to as a "blur").

For example, an image for appreciation in which a subject is blurred is not preferred. Especially in regard to a person's face, an image without blur is often preferred.

Further, in an image, blur can be regarded as degradation of information. Therefore, a blurred image is actively rejected in many cases. For example, blur of an authentication target in an image for authentication results in deterioration of authentication accuracy. Also, a blurred face image causes an authentication failure in face authentication. Therefore, it is useful to know how much a face being an authentication target is blurred.

A method of estimating a blur of an image is proposed (for example, see Patent Literature 1 (PTL 1) and Non-patent Literature 1 (NPL1)).

A technique described in PTL 1 (hereinafter, simply referred to as "PTL 1", including the technique) calculates a "blur", from a face region in an image. When a plurality of faces are present in the image, PTL 1 calculates an average of blurs in the plurality of faces, by using a weight proportional to an area of the face. Then, PTL 1 sets the average as a blur of the image.

In the above-described calculation, PTL 1 extracts a vertical edge point, a horizontal edge point, and an oblique edge point for a multi-resolution image of an entire face region, classifies the edge points, based on a predetermined reference value, and calculates a ratio of edge points where blurs occur, from among edge points having a certain intensity.

A technique described in NPL 1 (hereinafter, simply referred to as "NPL 1", including the technique) is a technique of estimating a depth from a blur of a subject. In a process of depth estimation, NPL 1 estimates a blur of a pixel. In the blur estimation, NPL 1 calculates, for any pixel in an image, a sum of absolute values of differences from peripheral pixels, and sets a sum total, in a predetermined region, of pixels of which the sums of absolute values are equal to or more than a certain value, as a blur.

CITATION LIST

Patent Literature

[PTL 1] Japanese Unexamined Patent Application Publication No. 2010-079446

Non Patent Literature

[NPL 1] S. K. Nayar and Y. Nakagawa, "Shape from Focus", IEEE Transactions on Pattern Analysis and Machine Intelligence, Volume: 16, Issue: 8, August 1994 pp. 824 to 831

SUMMARY OF INVENTION

Technical Problem

In a middle process of blur calculation, PTL 1 requires edge-extraction calculation for a multi-resolution image of an entire face region. Specifically, in PTL 1, it is necessary to process an image at a plurality of resolutions, for a face region. Therefore, in PTL 1, there is an issue that a calculation cost is high.

NPL 1 is capable of estimating a blur of any pixel of any image, not limited to a face image, at a low calculation cost.

However, an image including a predetermined target object such as a face image includes a portion that is easily affected by blur and a portion that is not easily affected by blur. Therefore, when estimating a blur of an image including a target object, it is necessary to consider a position for which a blur is estimated, and the like.

However, NPL 1 makes no mention of a position (for example, a position for which a blur of a face image is estimated) in blur estimation. Specifically, NPL 1 is capable of estimating a blur of a pixel, but has an issue that a blur of an image including a target object cannot be estimated.

An object of the present invention is to provide an image processing device and the like that resolve the above-described issues and estimates a highly accurate blur of an image while reducing a calculation cost.

Solution to Problem

An image processing device according to one aspect of the present invention includes: a memory; and at least one processor coupled to the memory. The processor performs operations. The operations includes: detecting a feature point to be used for authentication of an target object included in an image; calculating a first blur being a blur of a predetermined processing point in the feature point; and estimating, by using the first blur, a second blur being a blur of the target object.

An image processing method according to one aspect of the present invention includes: detecting a feature point to be used for authentication of a target object included in an image; calculating a first blur being a blur of a predetermined processing point in the feature point; and estimating, by using the first blur, a second blur being a blur of the target object.

A non-transitory computer-readable recording medium according to one aspect of the present invention embodies a program. The program causes a computer to perform a method. The method includes: detecting a feature point to be used for authentication of a target object included in an image, calculating a first blur being a blur of a predetermined processing point in the feature point, and estimating, by using the first blur, a second blur being a blur of the target object.

Advantageous Effects of Invention

According to the present invention, an advantageous effect that a highly accurate blur of an image is estimated while reducing a calculation cost is achieved.

EXAMPLE EMBODIMENT

In the following, an example embodiment of the present invention is described with reference to the drawings.

Each drawing is a drawing for describing an example embodiment of the present invention. However, a component described in the following example embodiment is an example, and does not limit the present invention.

Similar components in the drawings are given the same number, and repetitive description thereof may be omitted. Further, in a drawing used in the following description, description of a configuration of a part that does not relate to description of the present invention may be omitted and not be illustrated.

Note that, in the following description, "image blur" that affects "face image authentication" is used as a processing target in the example embodiment. For example, each example embodiment detects a feature point used for face authentication. Further, each example embodiment selects, from the feature points, a processing point related to the blur affecting face authentication.

However, this does not limit image processing, a processing-target image, a target object included in the image, image degradation, a feature point to be extracted, and the like related to each example embodiment.

For example, an image to be a processing target may be an image from which a feature point (for example, a feature point used for authentication) related to processing of the image can be extracted. For example, an image to be a processing target may be an entire image of a person, a living creature, a car, or the like.

Alternatively, a feature point may be selected based on a recognition target. For example, the feature point may be an endpoint, an intersection point, a branch-point, an inflection point, and the like in character recognition and the like.

Alternatively, each example embodiment may use not only "blur" occurring as a result of defocus and the like but also degradation of an image occurring as a result of illumination insufficiency, an obstacle such as fog, movement of a target object, or the like, as a processing target.

First Example Embodiment

In the following, a first example embodiment of the present invention is described with reference to the drawing.
[Description of Configuration]

First, a configuration of an image processing device 10 according to the first example embodiment is described with reference to the drawing.

Figure 1:
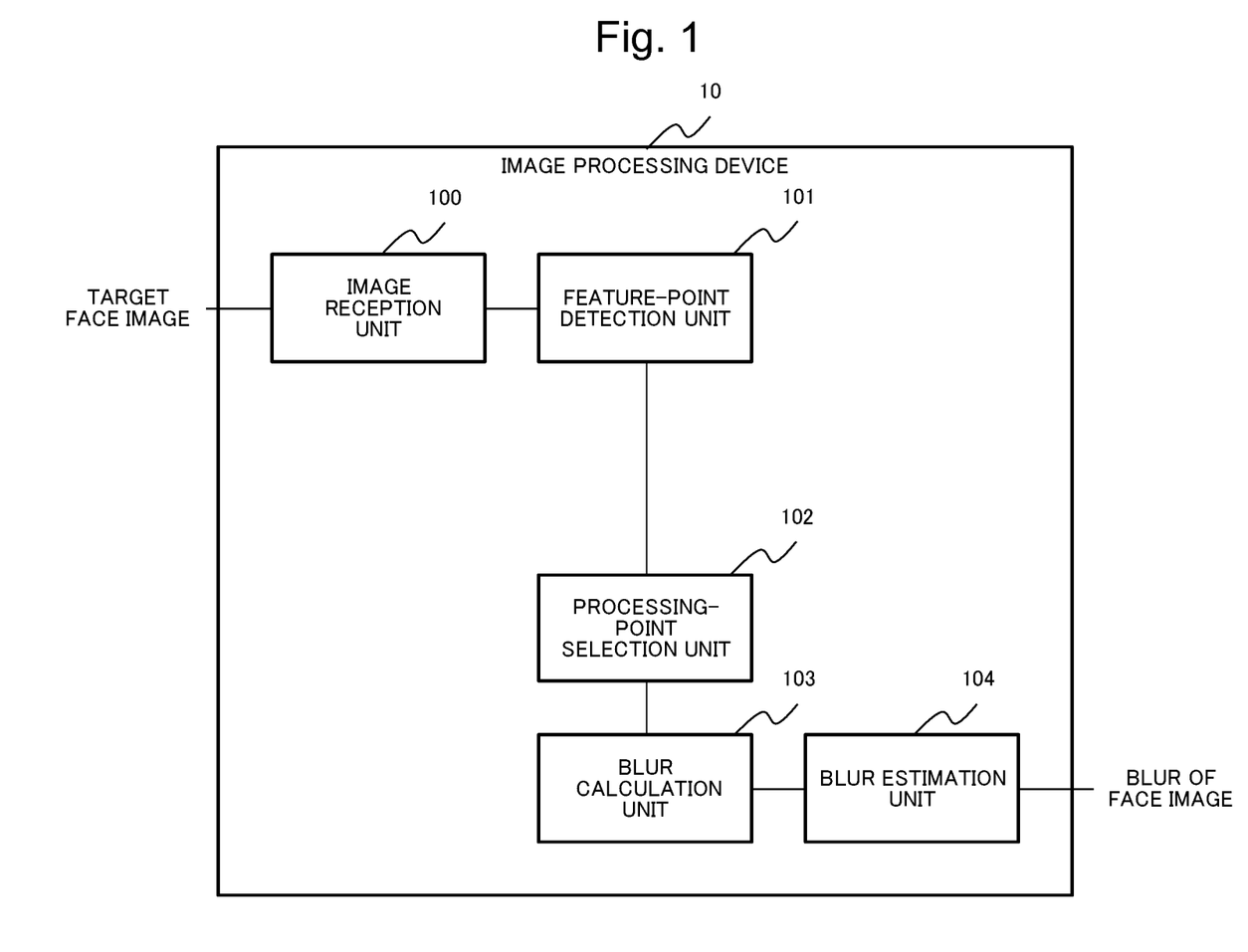
FIG. 1 is a block diagram illustrating one example of a configuration of an image processing device according to a first example embodiment of the present invention.

FIG. 1 is a block diagram illustrating one example of a configuration of the image processing device 10 according to the first example embodiment of the present invention.

The image processing device 10 includes an image reception unit 100, a feature-point detection unit 101, a processing-point selection unit 102, a blur calculation unit 103, and a blur estimation unit 104.

The image reception unit 100 receives a face image from a predetermined device (for example, an image capturing device). Alternatively, the image reception unit 100 may acquire a face image from a predetermined device (for example, a storage device). Hereinafter, a face image received or earned by the image reception unit 100 is also referred to as a "target face image".

In the present example embodiment, a target face image is not limited. A target face image may be a color image, or a monochrome image. A target face image may be an image captured by an image capturing device such as a camera, or an image read from a recording medium, a storage device, or the like storing an image in which a person's face is captured. Further, a target face image may be a corrected image (for example, an image to which trimming, color correction, or the like is applied).

The feature-point detection unit 101 detects, for use in face authentication, a face region and a feature point of a face of a person captured in a target face image.

The feature point of a face is a point representing a feature of a person in a face (including a facial contour) of the person, such as eyes and mouth.

A method used by the feature-point detection unit 101 is not limited. For example, Viola-Jones method is available as a method of detecting a face region and a feature point of a face. However, the Viola-Jones method is one example of a method used by the feature-point detection unit 101. The feature-point detection unit 101 may detect a face region and a feature point of a face by using another method.

The processing-point selection unit 102 selects, from among the detected feature points, a point (hereinafter, referred to as a "processing point") to be a target of blur calculation. A processing point is a point preliminarily determined from a portion that is easily affected by blur of a target object (in this case, a face).

For example, a facial part such as a mouth and an eye, and especially an endpoint of a facial part is a point useful in face authentication. When those portions are blurred, accuracy of face authentication declines. Thus, as a processing point, for example, at least some of endpoints (for example, an inner corner of an eye, an outer corner of an eye, and a corner of a mouth) of parts (for example, an eye and a mouth) of a target object (in this case, a face) are selected. For example, the processing-point selection unit 102 stores, as a processing point to be selected, at least some of endpoints of a main facial part such as an eye, a nose, and a mouth, and selects the processing point from feature points.

Further, the processing-point selection unit 102 may select, in addition to an endpoint of a part, a section point of a line segment (for example, a midpoint, a trisection point, and/or a quadrisection point of a line segment) connecting two endpoints and/or a point on an extended line extended from the line segment.

The processing-point selection unit 102 may preliminarily store a processing point to be selected. Alternatively, the processing-point selection unit 102 may acquire a processing point together with a face image to be a target. Note that, when a processing point in the image processing device 10 is fixed, the feature-point detection unit 101 or the blur calculation unit 103 may include the function of the processing-point selection unit 102.

The blur calculation unit 103 calculates a blur (first blur) for each selected processing point. However, it is desirable that the blur calculation unit 103 uses a calculation method requiring a low calculation cost. For example, the blur calculation unit 103 may use a method described in NPL 1, as a method of blur calculation. However, the method described in NPL 1 is one example of a method used by the blur calculation unit 103. The blur calculation unit 103 may calculate a blur by using another method.

The blur estimation unit 104 estimates, as a face image, a blur (second blur) by using the blur calculated by the blur calculation unit 103. In other words, the blur estimation unit 104 calculates an estimated value of the blur (second blur) as a face image by using the blur (first blur) of a predetermined processing point.

A blur used by the blur estimation unit 104 is not limited. A blur of a face image may be determined based on a predetermined knowledge such as a face image to be a target, or a device by which the blur is used.

For example, when a processing point for which a blur having a large value is calculated is appropriate as a blur of a face image, the blur estimation unit 104 may use, as the blur of the face image, an average value acquired by averaging a predetermined number of blurs of processing points in descending order from a processing point having a largest value of blur. Alternatively, when a processing point for which a blur having a small value is calculated is appropriate as a blur of a face image, the blur estimation unit 104 may use, as the blur of the face image, an average value acquired by averaging a predetermined number of blurs of processing points in ascending order from a processing points having a smallest value of blur. Alternatively, when a processing point for which a blur having a large value is calculated is appropriate as a blur of a face image, the blur estimation unit 104 may use, as the blur of the face image, an average value of blurs of processing points that have larger values than a predetermined threshold value. Alternatively, when a processing point for which a blur having a small value is calculated is appropriate as a blur of a face image, the blur estimation unit 104 may use, as the blur of the face image, an average value of blurs of processing points that have values smaller than a predetermined threshold value. Further, the blur estimation unit 104 may use not only an average value but also another value such as a mean value or a total value.

The blur estimation unit 104 outputs the estimated blur of the face image to a predetermined device.

[Description of Operation]

Next, an operation of the image processing device 10 according to the first example embodiment is described with reference to the drawings.

Figure 2:
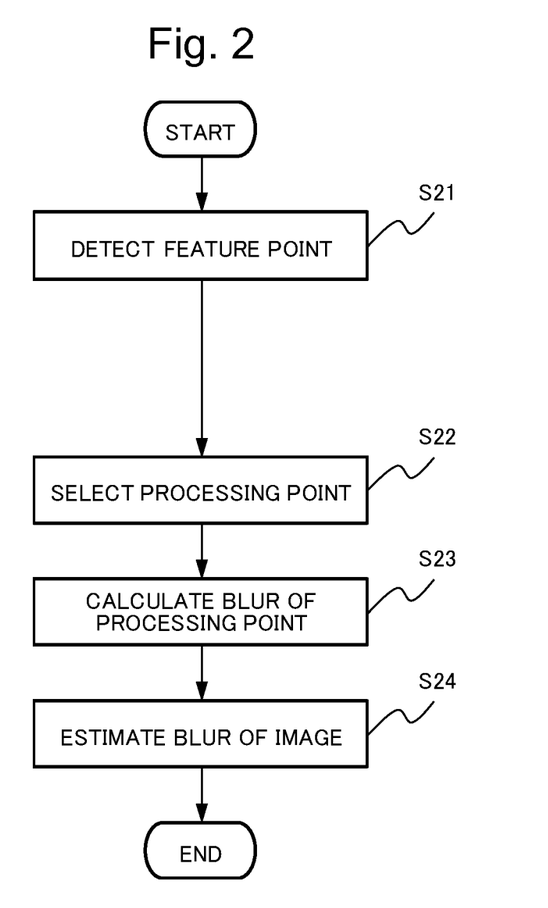
FIG. 2 is a flowchart illustrating one example of an operation of the image processing device according to the first example embodiment.

FIG. 2 is a flowchart illustrating one example of the operation of the image processing device 10 according to the first example embodiment. However, an operational flow illustrated in FIG. 2 is one example. The image processing device 10 may not necessarily execute each operation in an order illustrated in FIG. 2. For example, the image processing device 10 may execute steps S22 and S23 for each processing point.

Note that, it is assumed that the image reception unit 100 already has received a target face image.

The feature-point detection unit 101 detects a face region and a feature point of a face in the target face image (step S21).

Figure 3:
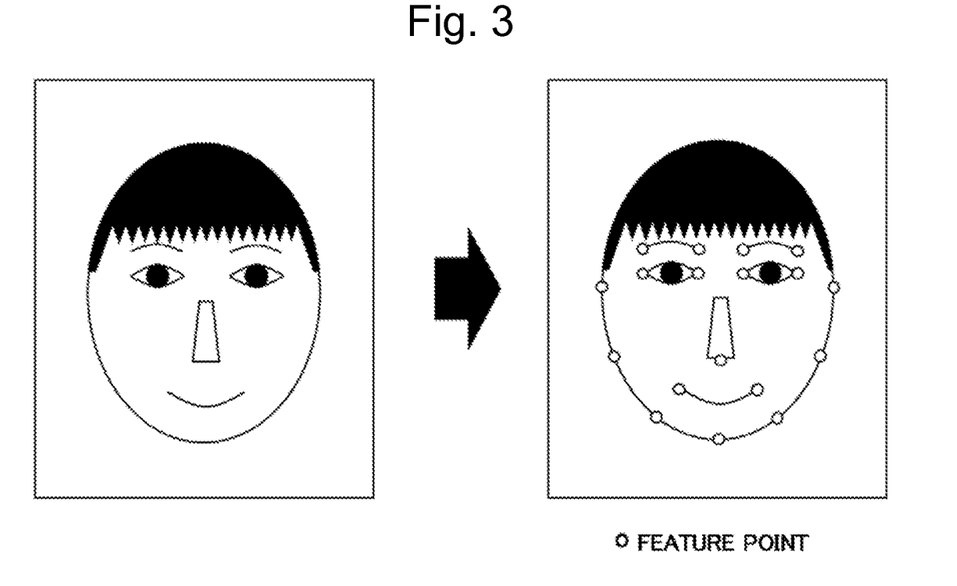
FIG. 3 is a diagram for describing one example of an operation of a feature-point detection unit.

FIG. 3 is a diagram for describing one example of an operation of the feature-point detection unit 101.

Left side of FIG. 3 is one example of a target face image.

A point illustrated by a circle in a right side of FIG. 3 is one example of the feature points detected by the feature-point detection unit 101. In a case of FIG. 3, the feature-point detection unit 101 detects, as the feature points, an outer corner of an eye, an inner corner of an eye, a philtrum, a corner of a mouth, an endpoints of an eyebrow, and a facial contour (face line).

Return to the description with reference to FIG. 2.

The processing-point selection unit 102 selects, from the detected feature points, a processing point for which a blur is calculated (step S22). The processing point is preliminarily set in the processing-point selection unit 102 as a point that is easily affected by blur. For example, a facial part (a region including eyes, eyebrows, a nose, and a mouth) is easily affected by blur. Thus, for example, the processing-point selection unit 102 selects, as a processing point, a feature point that is an endpoint of the facial part. Further, the processing-point selection unit 102 may select, as a processing point, a point (for example, a midpoint of a line segment connecting processing points) on the middle of a line segment connecting two processing points, and/or a point on an extended line extended from the line segment. Note that, when a processing point includes a section point and the like, those points are also preliminarily set in the processing-point selection unit 102.

Figure 4:
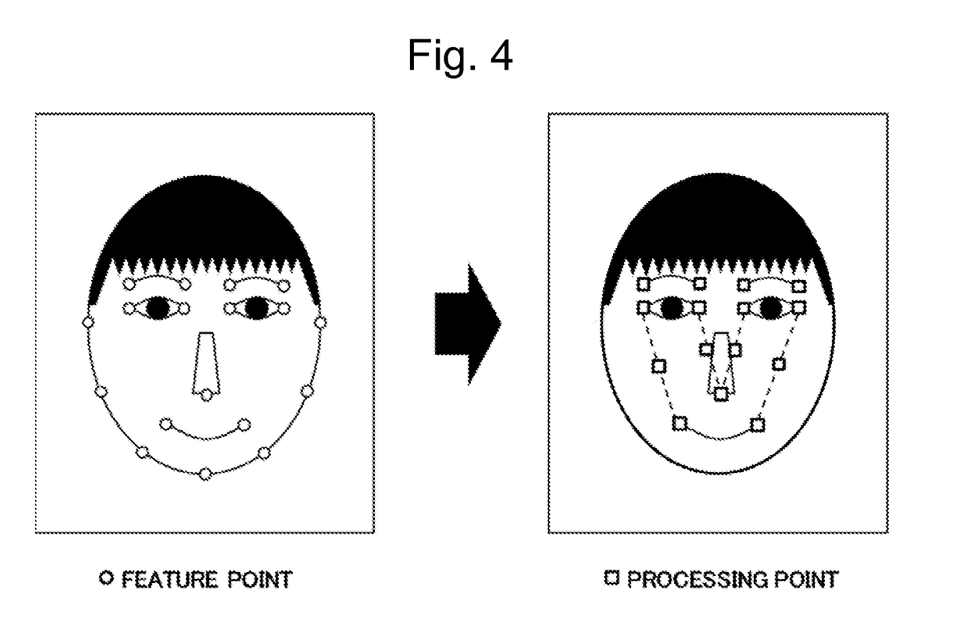
FIG. 4 is a diagram for describing one example of an operation of a processing-point selection unit.

FIG. 4 is a diagram for describing one example of an operation of the processing-point selection unit 102.

Left side of FIG. 4 illustrates feature points relevant to the right side of FIG. 3 and detected by the feature-point detection unit 101.

Right side of FIG. 4 is a diagram illustrating one example of selected processing points. A point illustrated by a square in the right side of FIG. 4 is the processing point. In a case of FIG. 4, the processing-point selection unit 102 selects, from the feature points, the following 11 points as processing points.

(1) Inner corners and outer corners of both eyes (four points)
(2) A philtrum (one point)
(3) Corners of mouth (two points)
(4) Endpoints of both eyebrows (four points)

Further, the processing-point selection unit 102 selects, in addition to the above, the following four points.

(1) A midpoint of a line segment connecting the inner corner of left eye and the philtrum
(2) A midpoint of a line segment connecting the inner corner of right eye and the philtrum
(3) A midpoint of a line segment connecting the outer corner of the left eye and the left corner of mouth
(4) A midpoint of a line segment connecting the outer corner of the right eye and the right corner of mouth Return to the description with reference to FIG. 2.

As described above, the processing-point selection unit 102 selects a point (for example, an endpoint of a part) that is easily affected by blur, from feature points in a face image.

Therefore, in the following processing, the image processing device 10 is capable of achieving highly accurate processing for blur.

The blur calculation unit 103 calculates a blur for the selected processing point (step S23). For example, the blur calculation unit 103 calculates a blur for each selected processing point by using the method described in NPL 1.

A blur used in NPL 1 is briefly described for reference.

Equation 1 is an equation for acquiring a blur index value F(i, j) being the blur used in NPL 1. i and j are positions (for example, i is a position in abscissa and j is a position in coordinate) of a pixel in an image. A function ML( ) is a function of a sum of absolute values. s is a distance (the number of pixels) between a target pixel and a preliminarily determined peripheral pixel. Generally, s is "one", i.e., a next pixel. However, s may be a number larger than one. A function I( ) is a value of a pixel. $T_1$ is a predetermined threshold value. N is a predetermined natural number.

The blur index value F(i, j) of a pixel at coordinates (i, j) is calculated for each pixel in a region "(2N+1)×(2N+1)" up to N pixels each in upward, downward, left, and right directions with the pixel (i, j) as the center. More specifically, the blur index value F(i, j) is a sum total of the sum-of-absolute-value ML(x, y)s that have values equal to or more than the predetermined threshold value ($T_1$), the sum-of-absolute-values ML(x, y) being a sum of differences between a pixel and peripheral pixels of the pixel which are separated by distance (pixel) s. A blur in this case is an index indicating that the smaller the value is, the smaller the difference from the peripheral pixel is, i.e., the more blurred.

$$F(i, j) = \sum_{x=i-N}^{i+N} \sum_{y=j-N}^{j+N} ML(x, y) \text{ for } ML(x, y) \geq T_1 \quad \text{[Equation 1]}$$

$$ML(x, y) = |2I(x, y) - I(x-s, y) - I(x+s, y)| +$$
$$|2I(x, y) - I(x, y-s) - I(x, y+s)|$$

When Equation 1 is applied to a processing point, the blur calculation unit 103 calculates a blur (an index value (i, j)) as follows. First, the blur calculation unit 103 calculates a sum of an absolute values between the processing points and pixels included in a region up to a predetermined number (N) of pixels each in upward, downward, left, and right directions with the processing point as the center. Then, the blur calculation unit 103 sets, as the blur, manipulation of the sum of absolute-values that are larger than the predetermined threshold value.

The above-described Equation 1, i.e., calculation in NPL 1 is addition/subtraction processing in one image, and therefore requires a low calculation cost. In calculation of a blur of a processing point, the blur calculation unit 103 uses a method requiring a low calculation cost, such as the above-described method.

The blur estimation unit 104 estimates a blur of the face image by using the blur calculated in the processing point (step S24).

In face authentication, when a portion with less blur is present in a portion (a portion that is easily affected by blur) that is important in authentication, accuracy of the face authentication is difficult to decrease. In face authentication, a blur of a least blurred part affects accuracy of authentication. Thus, for example, in a case of such a blur that an image is more blurred as a value is smaller, the blur estimation unit 104 calculates, as the blur of the image, an average value of blurs of a predetermined number of processing points from processing points (a point with less blur) having a large value of a blur. The blur estimation unit 104 may calculate, instead of the average value, a median value or a sum total. Calculation of an average value and the like is one example of calculation requiring a low calculation cost. The blur estimation unit 104 calculates, as the second blur, an average value, a median value, or a sum total of at least some of the first blur (a blur of a processing point).

In this case, the blur estimation unit 104 calculates a blur using blurs of some points (processing points) that are easily affected by blur, instead of blurs of all points of the face image. Therefore, the blur calculated by the blur estimation unit 104 is an estimated value of the blur of the face image. However, the estimated value is estimation using a point that is easily affected by blur. Therefore, while requiring a low calculation cost, the estimation is useful as estimation of a blur of a face image.

In this way, the blur estimation unit 104 calculates the estimated value of the blur of the image by using a calculation method requiring a low calculation cost.

As described above, the feature-point detection unit 101 detects a feature point representing a feature of a target object in an image. Then, the processing-point selection unit 102 selects, from among the feature points, a preliminarily set processing point that is easily affected by blur. The blur calculation unit 103 calculates a blur of the processing point by using a calculation method requiring a low calculation cost. Then, the blur estimation unit 104 estimates (calculates) a blur (second blur) of the image, from the blur (first blur) of the processing point by using a calculation method requiring a low calculation cost. Therefore, the image processing device 10 is capable of acquiring a highly accurate blur of the image while reducing a calculation cost.

[Description of Advantageous Effect]

Next, an advantageous effect of the image processing device 10 according to the first example embodiment is described.

The image processing device 10 according to the first example embodiment is capable of achieving an advantageous effect that a highly accurate blur of an image is calculated while reducing a calculation cost.

A reason for this is as follows.

The image processing device 10 includes the feature-point detection unit 101, the processing-point selection unit 102, the blur calculation unit 103, and the blur estimation unit 104. The feature-point detection unit 101 detects a feature point used for authentication of a target object included in an image.

The processing-point selection unit 102 selects, from the feature points, a predetermined processing point. The blur calculation unit 103 calculates a blur (first blur) of the processing point. The blur estimation unit 104 estimates (calculates) a blur (second blur) of the face image (target object) by using the blur of the processing point.

The feature-point detection unit 101 detects a feature point representing a feature of a target object in an image.

Then, the processing-point selection unit 102 selects, from among the feature points, a preliminarily set processing point (for example, an endpoint of a part that is easily affected by blur).

The blur calculation unit 103 calculates a blur of the processing point. However, as already described, the blur calculation unit 103 calculates the blur of the processing point by using a calculation method requiring a low calculation cost, such as NPL 1. As described above, the processing point is a point that is easily affected by blur. Therefore, the blur calculated by the blur calculation unit 103 is a blur of the point that is easily affected by blur. The blur calculation unit 103 calculates a highly accurate blur while reducing a calculation cost.

Then, the blur estimation unit 104 estimates a blur of the image by using the blur calculated by the blur calculation unit 103. However, as already described, the blur estimation unit 104 estimates the blur of the image by using a calculation method requiring a low calculation cost, such as an average value. The blur estimation unit 104 estimates a highly accurate blur of the image while reducing a calculation cost.

In this way, the image processing device 10 is capable of acquiring an estimated value of a highly accurate blur of an image while reducing a calculation cost.

[Overview of Example Embodiment]

An overview of the first example embodiment is described with reference to the drawing.

Figure 7:
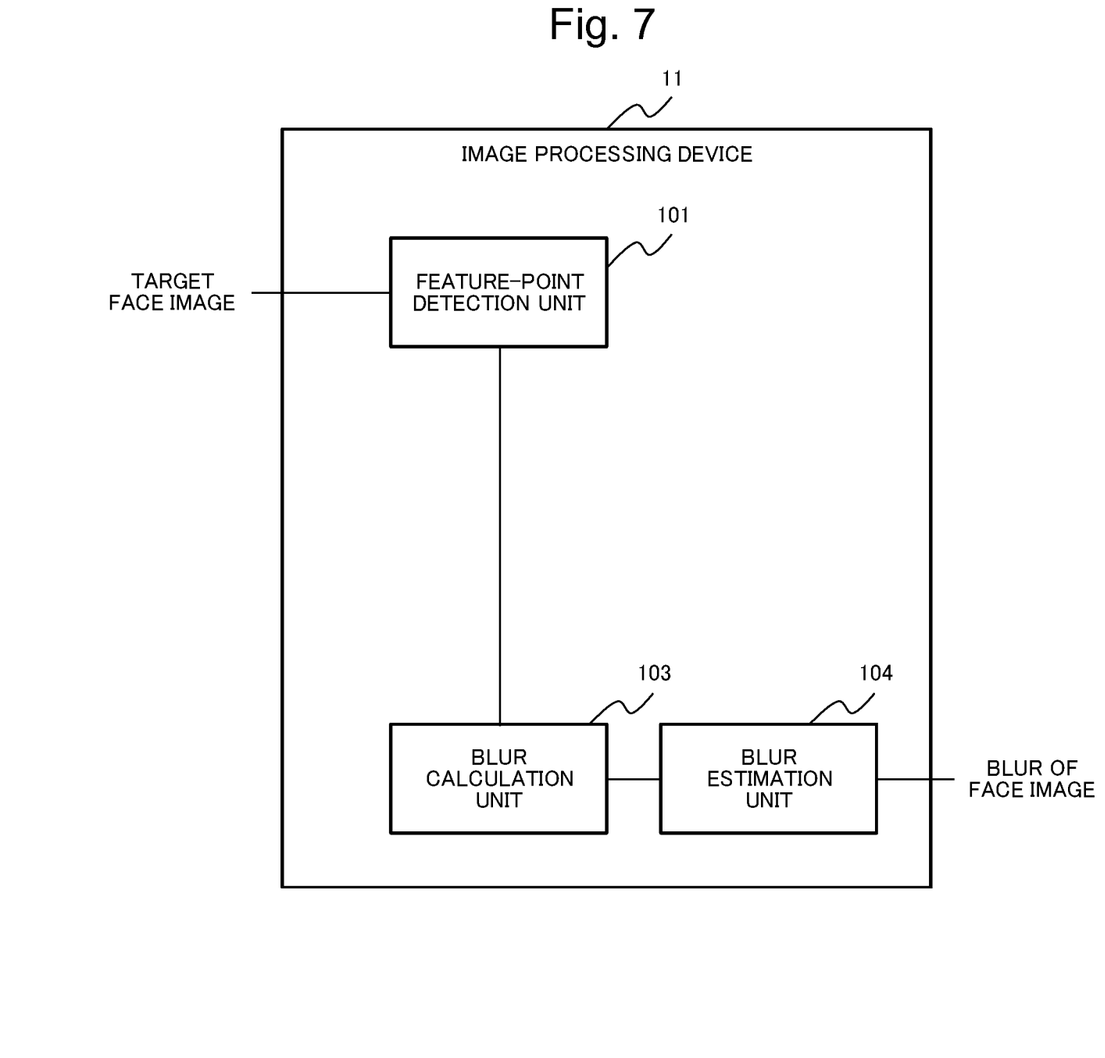
FIG. 7 is a block diagram illustrating one example of an overview of the image processing device according to the first example embodiment.

FIG. 7 is a block diagram illustrating one example of a configuration of an image processing device 11 being an overview of the image processing device 10 according to the first example embodiment. The image processing device 11 includes a feature-point detection unit 101, a blur calculation unit 103, and a blur estimation unit 104. The feature-point detection unit 101 detects a feature point used for authentication of a target object included in an image. The blur calculation unit 103 calculates a first blur being a blur of a predetermined processing point in the feature point. The blur estimation unit 104 estimates, by using the first blur, a second blur being a blur of the target object.

The feature-point detection unit 101 detects a feature point representing a feature of a target object in an image.

The blur calculation unit 103 may calculate, for example, from among the feature points, a blur of a preliminarily set processing point. The processing point is assumed to be a point that is easily affected by blur (for example, an endpoint of a part that is easily affected by blur). In this case, the blur calculated by the blur calculation unit 103 is a blur of the point that is easily affected by blur. As a result, the blur calculation unit 103 calculates a highly accurate blur while reducing a calculation cost. Specifically, the blur calculation unit 103 calculates a blur of a processing point by using a calculation method requiring a low calculation cost, such as NPL 1.

Then, the blur estimation unit 104 estimates a blur of the image by using the blur calculated by the blur calculation unit 103. In this case, as already described, the blur estimation unit 104 can estimate the blur of the image by using a calculation method requiring a low calculation cost, such as an average value. As a result, the blur estimation unit 104 is capable of estimating a highly accurate blur of the image while reducing a calculation cost.

In short, the image processing device 11 being a first minimum configuration is capable of achieving an advantageous effect that a highly accurate blur of an image is calculated while reducing a calculation cost, similarly to the image processing device 10.

[Hardware Configuration]

A hardware configuration of the image processing devices 10 and 11 is described with reference to the image processing device 10.

The image processing device 10 is configured as follows.

For example, each component of the image processing device 10 may be constituted by a hardware circuitry.

Alternatively, in the image processing device 10, each component may be constituted by using a plurality of devices connected via a network.

Alternatively, in the image processing device 10, a plurality of components may be constituted by single hardware.

Alternatively, the image processing device 10 may be achieved as a computer device including a central processing unit (CPU), a read only memory (ROM), and a random-access memory (RAM). The image processing device 10 may be achieved as a computer device further including, in addition to the above-described configuration, an input and output circuit (IOC). The image processing device 10 may be achieved as a computer device further including, in addition to the above-described configuration, a network interface circuit (NIC).

Figure 8:
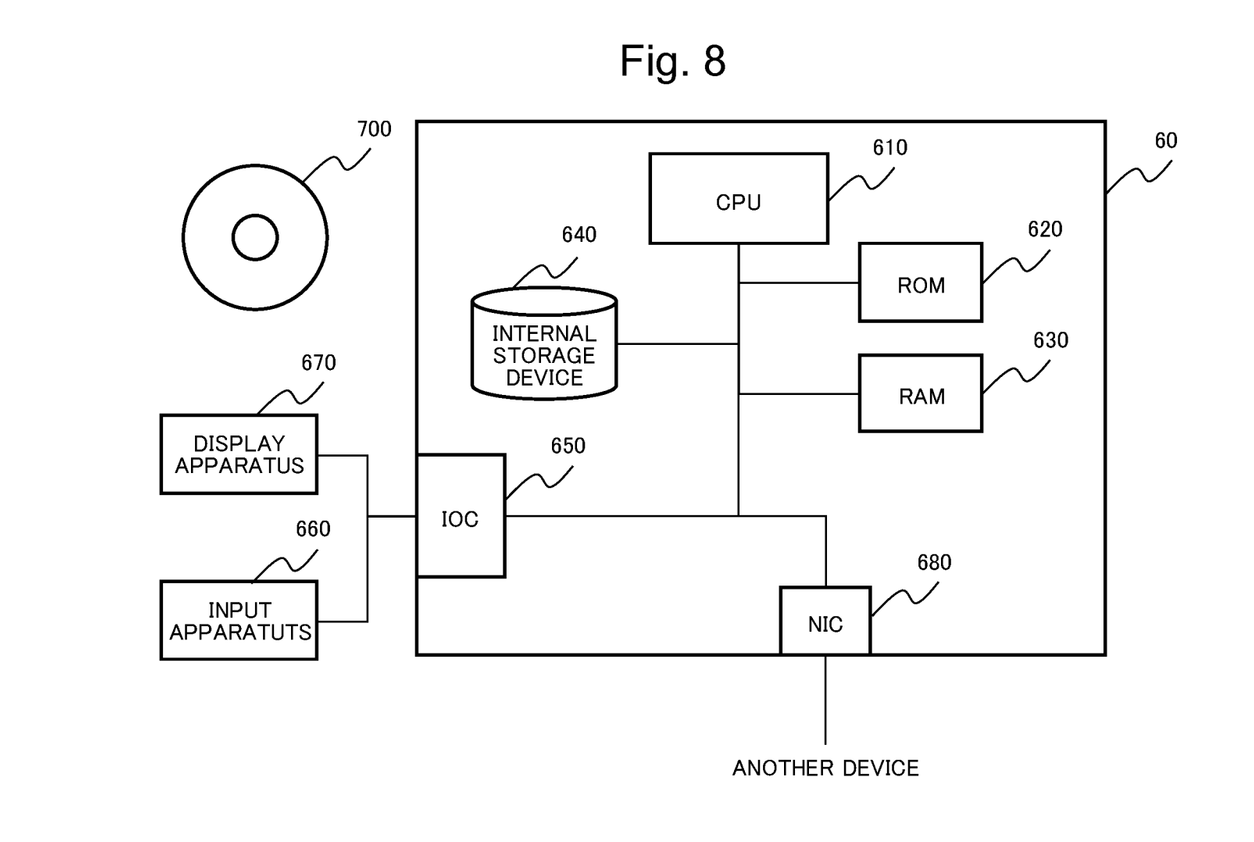
FIG. 8 is a block diagram illustrating one example of a hardware configuration of the image processing device according to the first example embodiment.

FIG. 8 is a block diagram illustrating a configuration of an image processing device 60 that is one example of a hardware configuration of the image processing device 10 according to the first example embodiment.

The image processing device 60 includes a CPU 610, a ROM 620, a RAM 630, an internal storage device 640, an IOC 650, and a NIC 680, and configures a computer device.

The CPU 610 reads a program from the ROM 620. Then, the CPU 610 controls the RAM 630, the internal storage device 640, the IOC 650, and the NIC 680, based on the read program. A computer including the CPU 610 controls those configurations and thereby achieves each function as the image reception unit 100, the feature-point detection unit 101, the processing-point selection unit 102, the blur calculation unit 103, and the blur estimation unit 104 illustrated in FIG. 1.

When achieving each function, the CPU 610 may use the RAM 630 or the internal storage device 640, as a temporal recording medium of the program.

Further, the CPU 610 may read a program included in a recording medium 700 computer-readably storing the program, by using an unillustrated recording-medium reading device. Alternatively, the CPU 610 may receive a program from an unillustrated external device via the NIC 680, and store the program in the RAM 630 or the internal storage device 640, and operate based on the stored program.

The ROM 620 stores a program to be executed by the CPU 610, and fixed data. The ROM 620 is, for example, a programmable ROM (PROM) or a flash ROM.

The RAM 630 temporarily stores a program to be executed by the CPU 610, and data. The RAM 630 is, for example, a dynamic RAM (DRAM).

The internal storage device 640 stores data and a program stored, for a long term, by the image processing device 60. Further, the internal storage device 640 may operate as a temporal storage device of the CPU 610. The internal storage device 640 is, for example, a hard disk device, a magneto-optical disk device, a solid state drive (SSD), or a disk array device.

Herein, the ROM 620 and the internal storage device 640 are non-transitory recording media. On the other hand, the RAM 630 is a transitory recording medium. The CPU 610 can operate based on a program stored in the ROM 620, the internal storage device 640, or the RAM 630. Specifically, the CPU 610 can operate by using a non-transitory recording medium or a transitory recording medium.

The IOC 650 mediates data between the CPU 610 and an input apparatus 660 as well as a display apparatus 670. The IOC 650 is, for example, an I/O interface card or a universal serial bus (USB) card. Further, the IOC 650 is not limited to a wired form such as a USB, and a wireless form may be used.

The input apparatus 660 is an apparatus that receives an input instruction from an operator of the image processing device 60. The input apparatus 660 is, for example, a keyboard, a mouse, or a touch panel.

The display apparatus 670 is an apparatus that displays information for an operator of the image processing device 60. The display apparatus 670 is, for example, a liquid crystal display.

The NIC 680 relays data exchange with an unillustrated external device via a network. The NIC 680 is, for example, a local area network (LAN) card. Further, the NIC 680 is not limited to a wired form, and a wireless form is used.

The image processing device 60 configured as described above is capable of acquiring an advantageous effect similar to the advantageous effect of the image processing device 10.

A reason for this is that the CPU 610 of the image processing device 60 is capable of achieving, based on a program, a function similar to the function of the image processing device 10.

Second Example Embodiment

Next, a second example embodiment is described with reference to the drawing.
[Description of Configuration]
First, an image processing device 50 according to the second example embodiment is described with reference to the drawing.

Figure 5:
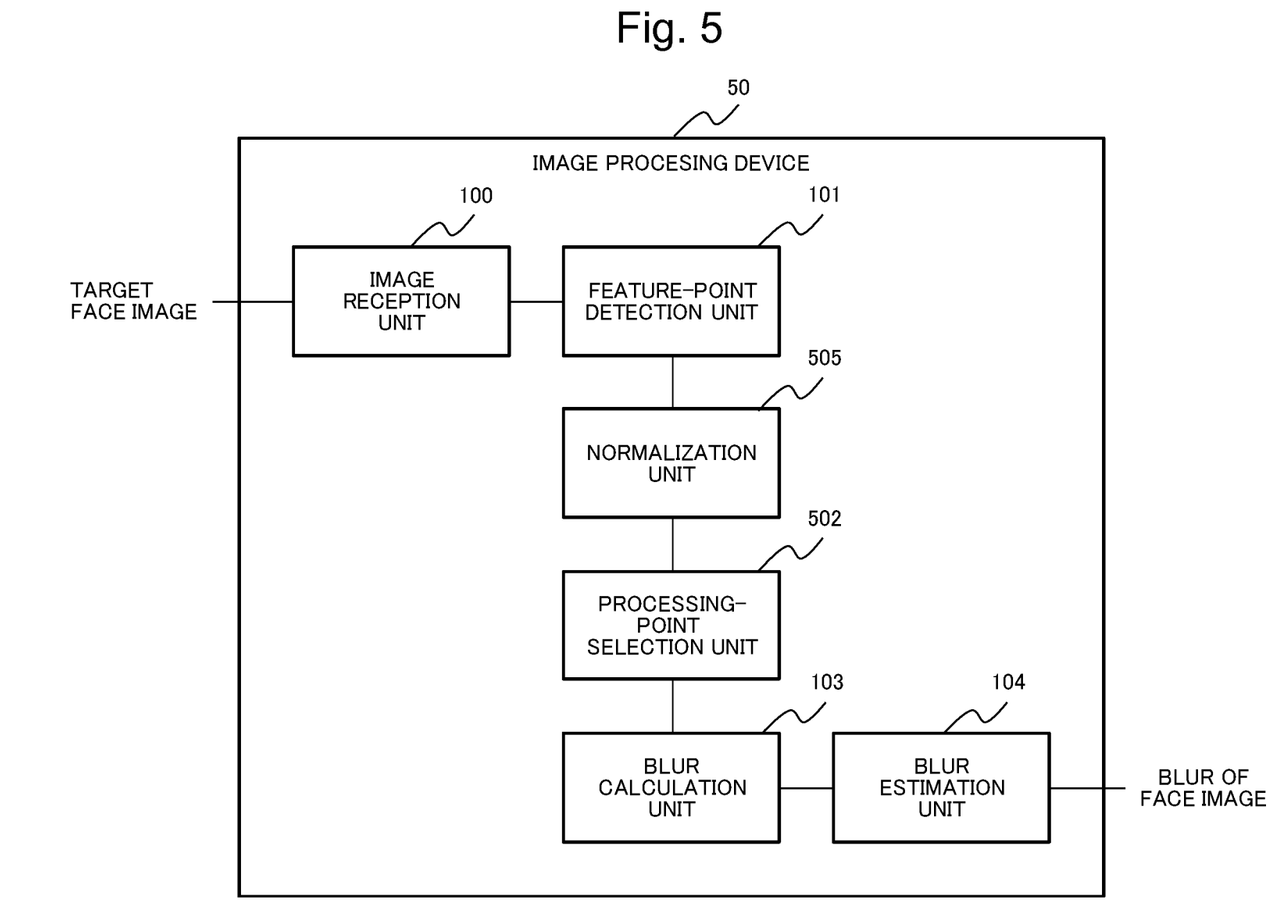
FIG. 5 is a block diagram illustrating one example of a configuration of an image processing device according to a second example embodiment.

FIG. 5 is a block diagram illustrating one example of a configuration of the image processing device 50 according to the second example embodiment.

In comparison with the image processing device 10 according to the first example embodiment, the image processing device 50 includes, instead of the processing-point selection unit 102, a processing-point selection unit 502.

Further, the image processing device 50 includes a normalization unit 505. A configuration other than the above description is the same as the image processing device 10 according to the first example embodiment, and therefore detailed description thereof is omitted.

The image processing device 50 may be achieved by using the computer device illustrated in FIG. 8, similarly to the image processing device 10.

The normalization unit 505 normalizes a target face image, based on a feature point detected by a feature-point detection unit 101. Hereinafter, a post-normalization image is referred to as a "normalized image".

In the present example embodiment, a target area of normalization is not limited. For example, normalization is normalization of a position of a face image, a size of the face image, and/or an angle of the face image.

Further, a normalization method used by the normalization unit 505 is not limited. For example, the normalization unit 505 may preliminarily store a reference feature point. The reference feature point is a feature point that is transformed in such a way as to be located at a preliminarily determined position (this position is referred to as a "reference") in normalization. The normalization unit 505 transforms a target face image by using a preliminarily stored reference feature point and a feature point in the target face image.

In this case, the normalization unit 505 transforms (for example, affine-transforms) the target face image in such a way that a feature point of the target face image relevant to the reference feature point is located at a position of the reference feature point. The normalization unit 505 may use not only affine transformation but also a method such as projection transformation, similarity transformation, or perspective projection transformation, as an image transformation method used for normalization.

Alternatively, the normalization unit 505 may also preliminarily store three-dimensional information and/or average three-dimensional facial-shape information of the reference feature point. In this case, the normalization unit 505 may normalize, in addition to a position, a size, and an angle, an orientation of the face image, by using the target face image and three-dimensional information (and/or average three-dimensional facial-coordinate information) of the reference feature point.

Average three-dimensional facial-shape information is a facial shape information acquired by averaging a predetermined number of pieces of three-dimensional information of facial shape. The three-dimensional information of facial shape used for the averaging may or may not include three-dimensional information of a facial shape of a target person.

The normalization unit 505 may not preliminarily store a position of the reference feature point, the three-dimensional information of the reference feature point, and/or the average three-dimensional facial-shape information of the reference feature point, and when performing processing, the normalization unit 505 may acquire those pieces of information from an unillustrated device and the like.

The processing-point selection unit 502 selects a processing point. However, the normalization unit 505 has already normalized a feature point. Therefore, the processing-point selection unit 502 selects a processing point from post-normalization feature points. For example, the processing-point selection unit 502 selects endpoints of eyes, eyebrows, a nose, and a mouth in a post-normalization image. In this case, the processing point is a point included in the normalized image.

However, in a post-normalization image, a feature point relevant to a reference feature point is transformed in such a way as to be located at the same position in any face image. Thus, the processing-point selection unit 502 may select a point (e.g., a reference feature point or a point at a predetermined position relevant to the reference feature point) at predetermined coordinates in a post-normalization face image. In this case, the processing-point selection unit 502 can select, as a processing point, a point located at the same position in all face images. In this case, the processing point is a point located at a preliminarily set position in the normalized image.

For example, depending on an image, there is a case where the feature-point detection unit 101 has difficulty in detecting a feature point in a portion that is easily affected by blur. In this case, the processing-point selection unit 102 according to the first example embodiment cannot select a processing point in the portion.

However, the processing-point selection unit 502 according to the second example embodiment is capable of selecting a point at predetermined coordinates in a post-normalization image, as a processing point. Therefore, even when a feature point cannot be detected in a portion that is easily affected by blur, the image processing device 50 is capable of selecting a processing point in the portion.

In this way, the processing-point selection unit 502 is capable of selecting a processing point more robustly than the processing-point selection unit 102.
[Description of Operation]
Next, one example of an operation of the image processing device 50 according to the second example embodiment is described with reference to the drawing.

Figure 6:
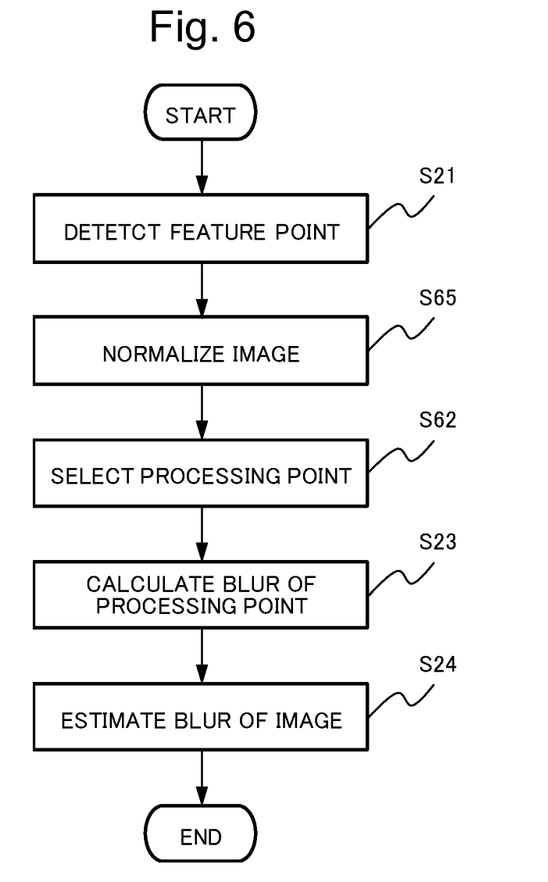
FIG. 6 is a flowchart illustrating one example of an operation of the image processing device according to the second example embodiment.

FIG. 6 is a flowchart illustrating one example of the operation of the image processing device 50 according to the second example embodiment. However, an operational flow illustrated in FIG. 6 is one example. The image processing device 50 may not necessarily execute each operation in an order illustrated in FIG. 6. For example, the image processing device 50 may execute steps S62 and S23 for each processing point.

Note that, detailed description of the same operation as the operation of the image processing device 10 according to the first example embodiment is omitted.

The normalization unit 505 normalizes a face image, based on a detected feature point (step S65). For example, the normalization unit 505 preliminarily stores three-dimensional information and/or average three-dimensional facial-shape information of a reference feature point relevant to the feature point. Then, the normalization unit 505 acquires a transformation parameter of perspective projection transformation by which the reference feature point is transformed to the detected feature point. Then, the normalization unit 505 projects a target face image on an average three-dimensional facial shape by using the acquired transformation parameter. In this way, the normalization unit 505 generates a face image in which a position and the like are normalized. However, as already described, a normalization method is not limited to this method. The normalization unit 505 may use any method.

The processing-point selection unit 502 selects, from a post-normalization face image, a processing point for which a blur is calculated (step S62). For example, the processing-point selection unit 502 selects, as a processing point, a point relevant to a feature point in the normalized face image. The processing-point selection unit 502 may select a processing point from the feature points in the normalized face image, or select a processing point by using a coordinate value of a reference feature point used for normalization.

[Description of Advantageous Effect]

Next, an advantageous effect of the image processing device 50 according to the second example embodiment is described.

The image processing device 50 according to the second example embodiment is capable of acquiring an advantageous effect of estimating a blur with further high accuracy, in addition to the advantageous effect of the first example embodiment.

A reason for this is as follows.

Before the processing-point selection unit 102 selects a processing point for which a blur is calculated, the normalization unit 505 normalizes a face image. As a result, in a post-normalization image, relations between adjacent pixels, and sizes of regions represented by one pixel are equalized in all face images.

When Equation 1 is used, the blur calculation unit 103 calculates a blur (blur index value of Equation 1) by using a calculation target pixel and peripheral pixels of the pixel. The normalization unit 505 equalizes relations between the calculation target pixel and the peripheral pixel. Therefore, calculation accuracy of a blur (blur index value) of a processing point is improved in comparison with calculation accuracy before normalization. As a result, the image processing device 50 is capable of improving estimation accuracy of an estimated value of a blur of an image using a blur of a processing point.

Further, the image processing device 50 according to the second example embodiment is capable of achieving an advantageous effect of calculating a blur more robustly.

A reason for this is as follows.

The normalization unit 505 transforms an image in such a way as to normalize a position of a feature point. Therefore, the feature point is transformed in such a way as to be located at the same position. As a result, even in an image in which the feature-point detection unit 101 cannot detect a feature point, the processing-point selection unit 502 is capable of selecting a processing point by using a position in a post-normalization image.

Detailed Example

Next, a detailed example of the second example embodiment is described with reference to the drawing.

(Description of Configuration)

A configuration of the image processing device 50 in the following description is the same as the above description. However, each configuration executes more detailed operation, as described below.

An image reception unit 100 receives a target face image, from an unillustrated camera.

The feature-point detection unit 101 detects a feature point of a face, from the target face image. The feature points of the face to be detected are assumed to be 18 points that are outer corners of both eyes (two points), inner corners of both eyes (two points), a philtrum (one point), corners of mouth (two points), endpoints of both eyebrows (four points), and a facial contour (seven points), illustrated in FIG. 3.

The normalization unit 505 normalizes the face image by using the detected feature point of the face. Further, the normalization unit 505 normalizes an orientation of the face by using average three-dimensional facial-shape information.

The processing-point selection unit 502 selects a processing point from the generated normalized face image. The processing points are assumed to be 11 feature points (note that, post-normalization feature points) excluding the seven points of the facial contour from the above-described 18 feature points.

The blur calculation unit 103 calculates a blur, for the selected processing point. The blur calculation unit 103 uses the method of NPL 1, for the calculation of a blur (blur index value).

A blur estimation unit 104 calculates, as a blur of the image, an average value of top five points having larger values among the blurs calculated by the blur calculation unit 103.

(Description of Operation)

Next, an operation of the detailed example is described. An operational flow is FIG. 6.

Note that, it is assumed that the image reception unit 100 has already received a target face image.

The feature-point detection unit 101 detects a feature point of a face in the target face image (step S21). For example, the feature-point detection unit 101 detects, by using the Viola-Jones method, feature points (18 points) in outer corners of both eyes, inner corners of both eyes, a philtrum, corners of mouth, eyebrows, and a facial contour (face line).

The normalization unit 505 normalizes the face image, based on the feature point (step S65). The normalization unit 505 preliminarily stores three-dimensional information and average three-dimensional facial-shape information of a reference feature point relevant to the feature point. Then, the normalization unit 505 acquires a transformation parameter of perspective projection transformation by which the reference feature point is transformed in such a way as to be located at a position of the detected feature point. Then, the normalization unit 505 projects a pixel on an average three-dimensional facial shape by using the transformation parameter. In this way, the normalization unit 505 generates a face image in which a position, a size, an angle, and/or orientation are/is normalized.

The processing-point selection unit 502 selects, from the generated post-normalization face image, a processing point for which a blur is calculated (step S62). The processing-point selection unit 502 selects, as processing points, points corresponding to remaining 11 points, excluding seven points of the facial contour from the detected feature points (18 points) in the normalized face image. The processing-point selection unit 502 uses, as a coordinate value of the feature point of the normalized face image, a coordinate value of the reference feature point used in the normalization.

The blur calculation unit 103 calculates a blur, for the selected processing point (step S23). The blur calculation unit 103 calculates a blur for each selected processing point by using the calculation method described in NPL 1. In particular, the blur calculation unit 103 calculates a blur (blur index value F(i, j)) of a processing point by assuming that "s=1, N=2, $T_1$=7" in Equation 1.

The blur estimation unit 104 estimates (calculates) a blur of the image by using the calculated blur (blur index value) (step S24). In this case, the blur (blur index value) calculated by the blur calculation unit 103 indicates that the image is more blurred as a value is smaller. Therefore, the blur estimation unit 104 sorts the blurs in descending order in magnitude, and calculates, as a blur of the image, an average value of blurs of top five points having larger values.

<Image Processing System>

Figure 9:
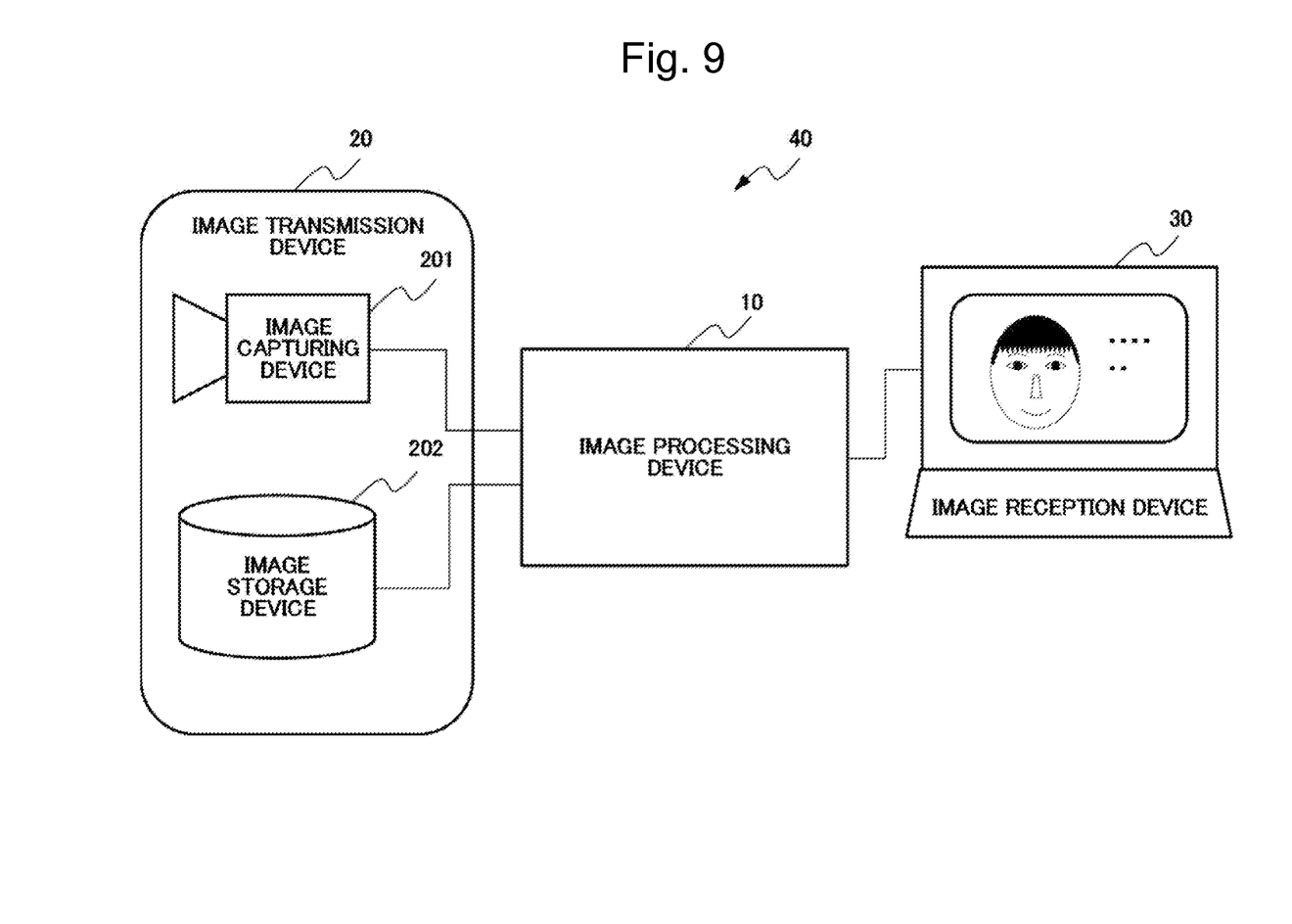
FIG. 9 is a diagram illustrating one example of a configuration of an image processing system according to the first example embodiment.

Next, an image processing system 40 including the image processing device 10 is descried with reference to the drawing. The image processing system 40 may include, instead of the image processing device 10, the image processing device 50 or the image processing device 11.

FIG. 9 is a block diagram illustrating one example of a configuration of the image processing system 40.

The image processing system 40 includes the image processing device 10, an image transmission device 20, and an image reception device 30.

The image transmission device 20 is a device that transmits a target face image to the image processing device 10. For example, the image transmission device 20 is an image capturing device 201. Alternatively, the image transmission device 20 is an image storage device 202 in which the image is stored. The image transmission device 20 may include a plurality of devices (for example, the image capturing device 201 and the image storage device 202). However, the image transmission device 20 is not limited to the above description.

As already described, the image processing device 10 estimates (calculates) a blur by using the target face image.

The image reception device 30 receives, from the image processing device 10, a blur (an estimated value of a blur) of the image, and displays a predetermined image. For example, the image reception device 30 receives, from the image processing device 10, a target face image and a blur of the image. Then, the image reception device 30 selects a target face image to be displayed, based on the blur, and displays the target face image.

Alternatively, the image reception device 30 may select a target face image to be used for face authentication, based on the blur.

Further, when an estimated value of a blur of a received target image does not satisfy a predetermined condition (for example, when the image is severely blurred), the image reception device 30 may request the image transmission device 20 and/or the image processing device 10 to re-acquire an image.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention is applicable to automatic determination or selection of a blurred face image.

For example, in a case of capturing an image of a person, a digital camera is, by using the present invention, capable of automatically adjusting focus when a face of the person is estimated to be blurred by a certain degree or more. Alternatively, when a face is estimated to be blurred by a certain degree or more in the captured image, a digital camera is capable of automatically setting the image as an erasure candidate. Also, when a face image being an authentication target is estimated to be blurred by a certain degree or more, a face authentication device is, by using the present invention, capable of prompting recapturing of a face image, and correcting a score in authentication.

REFERENCE SIGNS LIST

- 10 Image processing device
- 11 Image processing device
- 20 Image transmission device
- 30 Image reception device
- 50 Image processing device
- 60 Image processing device
- 100 Image reception unit
- 101 Feature-point detection unit
- 102 Processing-point selection unit
- 103 Blur calculation unit
- 104 Blur estimation unit
- 201 Image capturing device
- 202 Image storage device
- 502 Processing-point selection unit
- 505 Normalization unit
- 610 CPU
- 620 ROM
- 630 RAM
- 640 Internal storage device
- 650 IOC
- 660 Input apparatus
- 670 Display apparatus
- 680 NIC
- 700 Recording medium

What is claimed is:

1. An image processing device, comprising:
a memory; and
at least one processor coupled to the memory,
the processor performing operations, the operations comprising:
detecting a feature point of a face image of a target object to be used for face image authentication of the face image of the target object;

calculating a first blur being a blur of a predetermined processing point in the feature point and affecting the face image authentication; and estimating, by using the first blur, a second blur being a blur of the face image of the target object.

2. The image processing device according to claim 1, wherein the operations further comprise selecting the predetermined processing point from the feature points.

3. The image processing device according to claim 1, wherein the processing point is an endpoint of a part included in the target object.

4. The image processing device according to claim 3, wherein the processing point further includes at least one of a section point of a line segment connecting at least some of the processing points and a point on an extended line extended from the line segment.

5. The image processing device according to claim 1, wherein the operations further comprise calculating, as the first blur, a sum of an absolute value of a pixel in a region up to a predetermined number of pixels each in upward, downward, left, and right directions with the processing point as a center and an absolute value of the processing point, and calculates a sum total of the sum of the absolute values larger than a predetermined threshold value; and calculating, as the second blur, an average value, a median value, or a sum total of at least a part of the first blur.

6. The image processing device according to claim 1, wherein the operations further comprise generating a normalized image in which the target object is normalized in at least one of a position, a size, an angle, and an orientation of the target object, wherein the processing point is a point included in the normalized image.

7. The image processing device according to claim 6, wherein the operations further comprise storing a predetermined reference feature point being a reference of normalization, and generating the normalized image by using the feature point and the reference feature point.

8. The image processing device according to claim 6, wherein the processing point is a point at a preliminarily set position in the normalized image.

9. An image processing method, comprising:

detecting a feature point of a face image of a target object to be used for face image authentication of the face image of the target object;

calculating a first blur being a blur of a predetermined processing point in the feature point and affecting the face image authentication; and estimating, by using the first blur, a second blur being a blur of the face image of the target object.

10. A non-transitory computer-readable recording medium embodying a program, the program causing a computer to perform a method, the method comprising:

detecting a feature point of a face image of a target object to be used for face image authentication of the face image of the target object;

calculating a first blur being a blur of a predetermined processing point in the feature point and affection the face image authentication; and estimating, by using the first blur, a second blur being a blur of the face image of the target object.

* * * * *